United States Patent
Arnold et al.

(10) Patent No.: US 7,089,228 B2
(45) Date of Patent: Aug. 8, 2006

(54) COMPUTER APPARATUS AND METHOD FOR CACHING RESULTS OF A DATABASE QUERY

(75) Inventors: Jeremy Alan Arnold, Rochester, MN (US); Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/125,190

(22) Filed: Apr. 18, 2002

(65) Prior Publication Data

US 2003/0200194 A1   Oct. 23, 2003

(51) Int. Cl.
*G06F 17/30* (2006.01)
(52) U.S. Cl. .................... 707/3; 707/1; 707/104.1; 707/205
(58) Field of Classification Search ............... 707/2, 707/3
See application file for complete search history.

(56) References Cited

U.S. PATENT DOCUMENTS

| | | | |
|---|---|---|---|
| 6,578,113 B1 * | 6/2003 | Krishnamurthy et al. ... | 711/141 |
| 6,826,557 B1 * | 11/2004 | Carter et al. .................... | 707/2 |
| 6,941,310 B1 * | 9/2005 | Ahad et al. .................. | 707/100 |
| 2002/0143855 A1 * | 10/2002 | Traversat et al. ........... | 709/202 |

OTHER PUBLICATIONS

Chutney Technologies Extends Its Dynamic Content Acceleration Leadership with Enhanced Enterprise-Class Functionality, PR Newswire, May 8, 2001.*

* cited by examiner

*Primary Examiner*—Jean M. Corrielus
(74) *Attorney, Agent, or Firm*—Martin & Associates, LLC; Derek P. Martin (57) ABSTRACT

A query processor caches data retrieved from executing prepared statements, and uses the cached data for subsequent accesses to the data, if certain conditions for using the cached data are met. The preferred embodiments also include a data staleness handler that takes care of issues that arise from data that may have changed in the database but is not reflected in the cache. One way to handle data staleness in the cache is to specifically enable or disable caching in a query. If caching is disabled, the query processor will access the data in the database. Another way to handle data staleness in the cache is to provide a timer that causes the cache to be invalidated when the timer times out. Yet another way to handle data staleness in the cache is to provide specified conditions that must be met for caching to occur, such as time or date limitations. Still another way to handle data staleness in the cache is to provide an update trigger for the data in the database that corresponds to the cached data. When the data in the database is updated, the update trigger fires, causing the cache to be invalidated. Note that invalidating the cache could also be followed by automatically updating the cache. By caching the results of processing a prepared statement, other queries that use the same prepared statement may be able to access data in the cache instead of going to the database.

33 Claims, 9 Drawing Sheets

FIG. 1

SELECT * FROM EMPLOYEE
WHERE DEPARTMENT = 46F

FIG. 2

SELECT * FROM EMPLOYEE
WHERE DEPARTMENT = ?

FIG. 3

| Employee Table | | | | |
|---|---|---|---|---|
| LASTNAME | FIRSTNAME | PHONE | DEPARTMENT | EMPLOYEEID |
| JOHNSON | RONALD | 555-0001 | 46F | 1 |
| SMITH | CHERYL | 555-0110 | 23G | 2 |
| JONES | WILLIAM | 555-2345 | 10C | 3 |
| DAVIS | ROBERT | 555-7890 | 46F | 4 |
| BROWN | KATHY | 555-1357 | 12A | 5 |
| MILLER | JENNIFER | 555-9975 | 46F | 6 |
| JENKINS | PAT | 555-4436 | 10C | 7 |

FIG. 4

| Salary Table | | | |
|---|---|---|---|
| SALARY | BONUS | DATE | EMPLOYEEID |
| 46000 | 0 | 1/1/2001 | 1 |
| 81000 | 0 | 1/1/2001 | 2 |
| 96000 | 3000 | 1/1/2001 | 3 |
| 72000 | 1000 | 1/1/2001 | 4 |
| 110000 | 5000 | 1/1/2001 | 5 |
| 58000 | 0 | 1/1/2001 | 6 |
| 70000 | 2000 | 1/1/2001 | 7 |

```
java.util.Properties jdbcProperties = new Properties();
try {
        jdbcProperties.put("caching", "0");                              810
        Class.forName("com.ibm.as400.access.AS400JDBCDriver");           820
        DriverManager.getConnection("jdbc:as400//ctc40028",              830
jdbcProperties);
} catch (Exception e) { }                                                840
```

FIG. 8

```
try {
        ps1 = conn.prepareStatement("SELECT * FROM EMPLOYEE      910
WHERE DEPARTMENT = ?");
        ps1.setProperty("caching", "1", "-1");                   920
        ps1.setString("46F");                                    930
        ps1.executeQuery();                                      940
}
```

FIG. 9

| ResultSet | | | | |
|---|---|---|---|---|
| LASTNAME | FIRSTNAME | PHONE | DEPARTMENT | EMPLOYEEID |
| JOHNSON | RONALD | 555-0001 | 46F | 1 |
| DAVIS | ROBERT | 555-7890 | 46F | 4 |
| MILLER | JENNIFER | 555-9975 | 46F | 6 |

FIG. 10

```
try {
    ps1 = conn.prepareStatement("SELECT * FROM EMPLOYEE   1110
WHERE DEPARTMENT = ?");
    ps1.setProperty("caching", "1", "-1");                 1120
    ps1.setProperty("invalidate cache", "update trigger"); 1130
    ps1.setString("46F");                                  1140
    ps1.executeQuery();                                    1150
}
```

FIG. 11

| ResultSet | | | | |
|---|---|---|---|---|
| LASTNAME | FIRSTNAME | PHONE | DEPARTMENT | EMPLOYEEID |
| JOHNSON | RONALD | 555-0001 | 46F | 1 |
| DAVIS | ROBERT | 555-7890 | 46F | 4 |
| MILLER | JENNIFER | 555-9975 | 46F | 6 |

```
try {
    ps1 = conn.prepareStatement("SELECT * FROM SALARY          1510
WHERE EMPLOYEEID BETWEEN ? AND ?");
    ps1.setProperty("caching", "1", "-1");                      1520
    ps1.setProperty("invalidate cache", "01/01/2002", "01/31/2002"); 1530
    ps1.setInt(1,2);                                            1540
    ps1.setInt(2,5);                                            1550
    ps1.executeQuery();                                         1560
}
```

```
try {
    ps1 = conn.prepareStatement("SELECT * FROM SALARY      1710
WHERE EMPLOYEEID BETWEEN ? AND ?");
    ps1.setProperty("caching", "1", "2");                  1720
    ps1.setProperty("invalidate cache", "01/01/2002", "01/30/   1730
2002");
    ps1.setInt(1,3);                                       1740
    ps1.setInt(2,4);                                       1750
    ps1.executeQuery();                                    1760
}
```

FIG. 17

| ResultSet | | | |
|---|---|---|---|
| SALARY | BONUS | DATE | EMPLOYEEID |
| 96000 | 3000 | 1/1/2001 | 3 |
| 72000 | 1000 | 1/1/2001 | 4 |

FIG. 18

```
try {
    ps1 = conn.prepareStatement("SELECT * FROM         1910
CUSTOMER WHERE LASTNAME = ?");
    ps1.setProperty("caching", "1", "-1");             1920
    ps1.setProperty("invalidate cache", 10);           1930
    ps1.setString("COOPER");                           1940
    ps1.executeQuery();                                1950
}
```

FIG. 19

| ResultSet | | | |
|---|---|---|---|
| LASTNAME | FIRSTNAME | PHONE | PURCHASES |
| COOPER | BETH | 417-555-7892 | 55 |

COMPUTER APPARATUS AND METHOD FOR CACHING RESULTS OF A DATABASE QUERY

BACKGROUND OF THE INVENTION

1. Technical Field

This invention generally relates to computer systems, and more specifically relates to apparatus and methods for accessing data in a computer database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Data is often accessed in a database using queries. A query is a statement in a particular syntax that specifies what data in the database to retrieve. A query processor typically processes a query and retrieves data from the database that matches parameters specified in the query. One particular type of query is known as a prepared statement, which is a query statement that contains variables. The prepared statement is used by specifying values for the variables, then executing the statement. Prepared statements enhance the efficiency of a query processor because once the prepared statement has been evaluated, it can be executed by the query processor using new values for the variables without having to perform all of the work to process the statement anew.

Some prepared statements are executed numerous times on data that does not often change. The use of the prepared statements reduces the work that must be performed by the query processor, but the data must still be retrieved from the database each time the prepared statement is executed. Without an apparatus and method that reduces the time to access data that seldom changes in a database, the computer industry will continue to suffer from excessive overhead in accessing database data.

DISCLOSURE OF INVENTION

According to the preferred embodiments, a query processor caches data retrieved from executing prepared statements, and uses the cached data for subsequent accesses to the data, if certain conditions for using the cached data are met. The preferred embodiments also include a data staleness handler that takes care of issues that arise from data that may have changed in the database but is not reflected in the cache. One way to handle data staleness in the cache is to specifically enable or disable caching in a query. If caching is disabled, the query processor will access the data in the database. Another way to handle data staleness in the cache is to provide a timer that causes the cache to be invalidated when the timer times out. Yet another way to handle data staleness in the cache is to provide specified conditions that must be met for caching to occur, such as time or date limitations. Still another way to handle data staleness in the cache is to provide an update trigger for the data in the database that corresponds to the cached data. When the data in the database is updated, the update trigger fires, causing the cache to be invalidated. Note that invalidating the cache could also be followed by automatically updating the cache. By caching the results of processing a prepared statement, other queries that use the same prepared statement may be able to access data in the cache instead of going to the database.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to enhancing the performance of processing database queries. For those not familiar with databases, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 2:
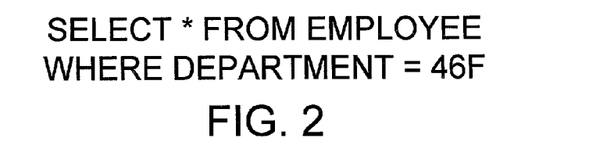
FIG. 2 is a sample database query in Structured Query Language (SQL)

One popular way to define a query uses Structured Query Language (SQL). SQL defines a syntax for generating and processing queries that is independent of the actual structure and format of the database. One sample SQL query is shown in FIG. 2. The "SELECT *" statement tells the database query processor to select all columns, the "FROM EMPLOYEE" statement identifies which database table (Employee) to search, and the "WHERE" clause specifies one or more expressions that must be satisfied for a record to be retrieved. Note that the "WHERE" clause of FIG. 2 states that DEPARTMENT=46F, where DEPARTMENT is a column in the EMPLOYEE table and 46F is a value in the DEPARTMENT column that will cause a particular record to be retrieved in response to the query. Note that information about the internal storage of the data is not required as long as the query is written in terms of expressions that relate to values in columns from tables.

Prepared Statements

A prepared statement is a particular type of query that includes one or more variables that may be dynamically specified. Once a prepared statement has been processed by the query processor a first time, subsequent evaluations of the same prepared statement require significantly less processing. Thus, the efficiency of database accesses using queries can be increased if the queries are prepared statements.

Figure 3:
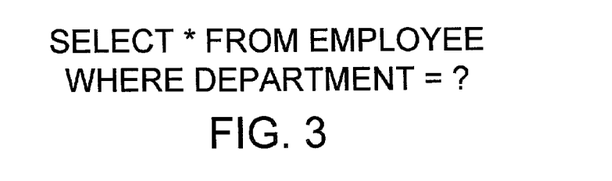
FIG. 3 is a sample prepared statement similar to the query in FIG. 2.

One example of a prepared statement is shown in FIG. 3. Note that this is the same query as in FIG. 2, but the value "46F" in the "WHERE" clause has been replaced by a variable "?". The value for this variable must be specified when the prepared statement is executed by the query processor. The prepared statement of FIG. 3 could generate identical results to the query of FIG. 2 if the variable "?" in the "WHERE" clause is given a value of "46F" when the prepared statement is executed. Prepared statements provide a powerful way to increase the performance of database accesses by reducing the work a query processor must perform when evaluating a prepared statement that has been previously processed.

2.0 Detailed Description

The preferred embodiments provide a way to cache results of database queries, and to use those results under certain conditions if they satisfy subsequent queries. The preferred embodiments also provide many mechanisms and methods for handling the issue of data staleness, which can arise when the data in the cache may not accurately reflect the corresponding data in the database.

Figure 1:
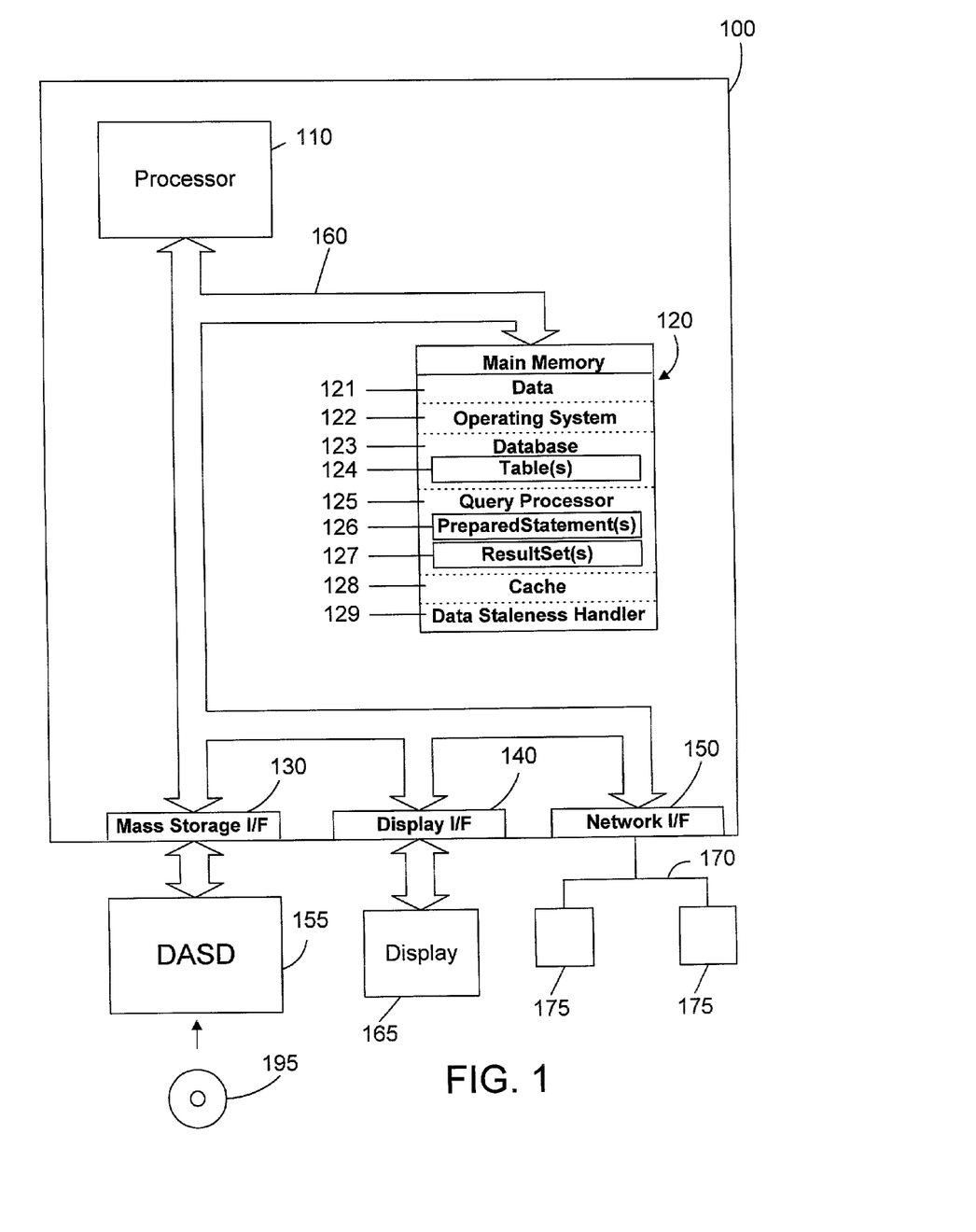
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, a database 123, a query processor 125, a cache 128, and a data staleness handler 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 comprises any suitable table 124 or collection of tables 124.

Query processor 125 is used to process one or more queries to database 123. One specific type of query is a prepared statement 126. When query processor 125 processes a prepared statement 126, it generates a result set 127 that contains the results of the query. While prior art query processors also generate prepared statements and generate corresponding result sets, a primary difference between the preferred embodiments and the prior art is that the result sets may be cached for later use. Once query processor 125 processes a query (such as a prepared statement 126), the results of the query (such as the result set 127) is stored in cache 128. When query processor 125 later processes the same query, the data stored in cache 128 may be returned instead of accessing the data in the database, assuming that the cached data satisfies the later query, and assuming that all conditions for using cached data have been satisfied.

Data staleness handler 129 determines whether or not data stored in cache 128 may be used when processing a similar query. Data staleness handler 129 may use any suitable criteria for determining whether or not to use cached data. For example, data staleness handler 129 may inhibit use of cached data if caching is explicitly turned off in a query. Data staleness handler 129 may include an update trigger that monitors database locations that correspond to data stored in the cache 128, and that invalidates the cached data when a change to corresponding data in the database is detected. Data staleness handler 129 may include a timer that causes the cached data to be invalidated when the timer times out. Note that when data staleness handler 129 invalidates cached data (e.g., when an update trigger fires or when a timer times out), it can also reload the cache from the database so the cached data is available for future queries. The data staleness handler 129 may also determine whether caching is allowed based on a specified time range or range of dates. Note that the claims and specification herein are expressed in terms of the data staleness handler determining when caching cannot be used. It is understood, however, that determining when caching cannot be used inherently also determines when caching can be used, and the function of data staleness handler 129 may be expressed either way within the scope of the preferred embodiments. In addition, while data staleness handler 129 is shown separate from the query processor 125 in FIG. 1 for the sake of illustration, in the preferred embodiment the function of the data staleness handler 129 is incorporated into the query processor 125.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query processor 125, cache 128, and data staleness handler 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

Figure 4:
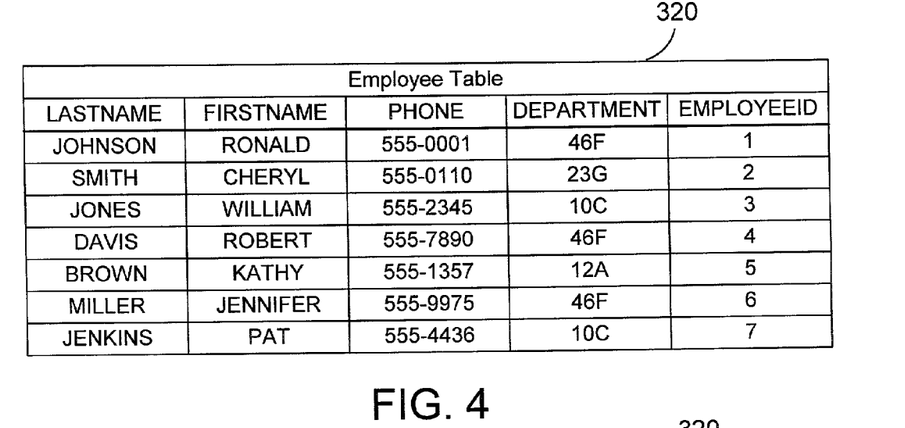
FIG. 4 is a sample database table for illustrating the preferred embodiments herein.
Figure 5:
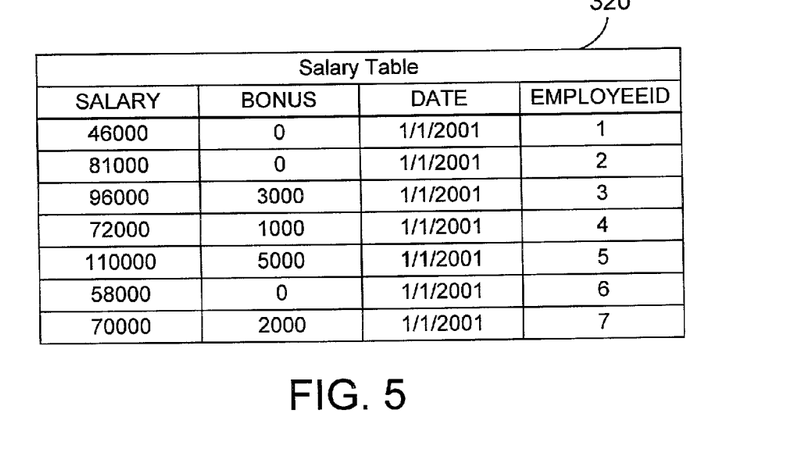
FIG. 5 is a second sample database table for illustrating the preferred embodiments herein.
Figure 6:
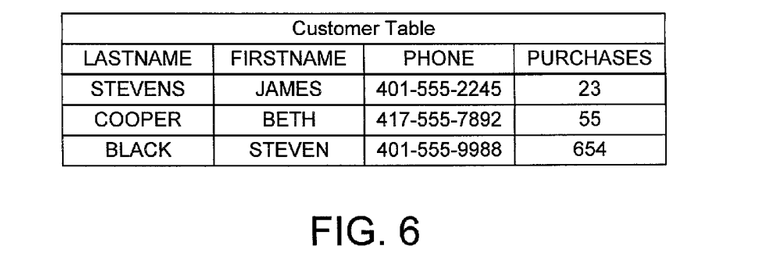
FIG. 6 is a third sample database table for illustrating the preferred embodiments herein.

The remainder of this specification provides details regarding how the query processor and data staleness handler may store results of a database query into a cache, and retrieve data from the cache under certain conditions to enhance the performance of the query processor. To illustrate the concepts of the preferred embodiments, three sample database tables are shown in FIGS. 4–6. FIG. 4 shows a table named Employee, FIG. 5 shows a table named Salary, and FIG. 6 shows a table named Customer. The specific data in these tables are used to illustrate the caching of the results of database queries, as discussed in detail below.

Figure 7:
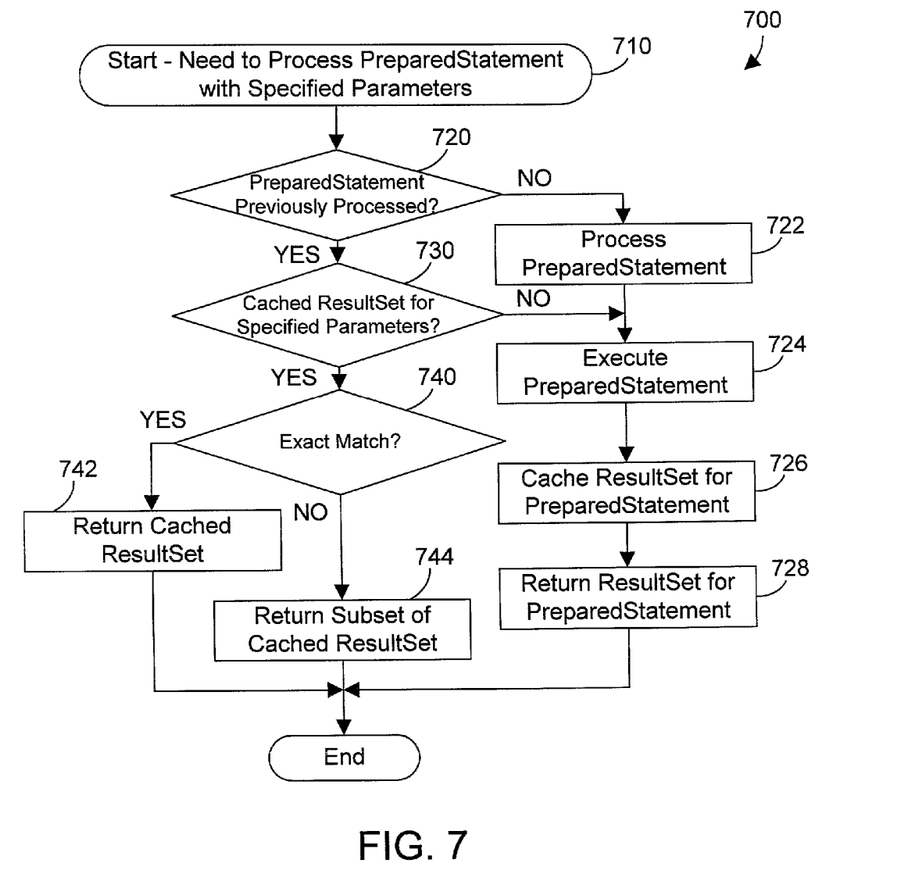
FIG. 7 is a flow diagram of a method for processing queries in accordance with the preferred embodiments.

Referring to FIG. 7, a method 700 for processing a prepared statement is one specific method within the scope of the preferred embodiments for a query processor to process one particular type of database query, a prepared statement. Method 700 begins when the query processor needs to process a prepared statement with specified parameters that correspond to variables in the prepared statement (step 710). Referring back to FIG. 3, method 700 would begin when the prepared statement is executed with a specified value for the "?" variable, such as 46F (see FIG. 2). Method 700 then determines whether the prepared statement has been previously processed (step 720). If not (step 720=NO), the prepared statement is processed (step 722) and executed (step 724), the result set for the prepared statement is stored in a cache (step 726), and the result set is then returned (step 728). If the prepared statement was previously executed (step 720=NO), method 700 then determines whether there is a cached result set for the specified parameters in the prepared statement (step 730). Note that the cached result set could be a result set that was generated from executing the prepared statement with the exact same parameters as the current prepared statement, or could be a result set that was generated from executing the prepared statement with parameters that are inclusive of the parameters in the current prepared statement. If there is no cached result set for the specified parameters (step 730=NO), the prepared statement is executed (step 724), the corresponding result set retrieved from the database is stored in the cache (step 726), and the result set for the prepared statement is then returned (step 728). If there is a cached result set for the specified parameters (step 730=YES), method 700 next determines whether the parameters of the current prepared statement exactly match the parameters for the previously-executed prepared statement that generated the results stored in the cache (step 740). If the parameters match exactly (step 740=YES), the result set in the cache for the prepared statement is returned (step 742). If the parameters do not match exactly (step 740), a subset of the cached result set is returned (step 744). In this manner, an entire cached result set is returned if the parameters to the prepared statements match exactly, or a portion of the cached result set is returned if the parameters to the current prepared statement are a subset of the parameters of the previously-processed prepared statement. We now look to specific examples to illustrate the function of the query processor in accordance with method 700 of FIG. 7.

Figure 8:
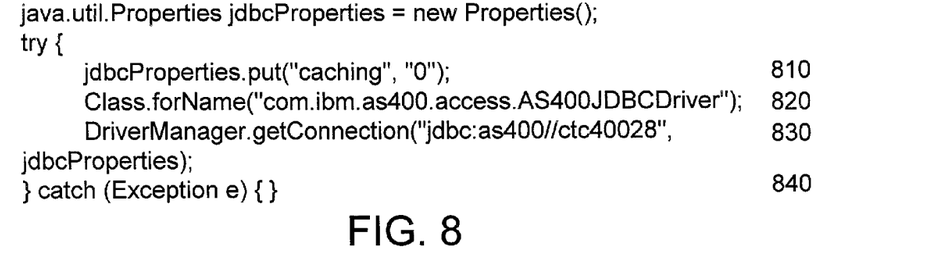
FIG. 8 is sample Java pseudo-code that defines caching properties on a database connection.

FIG. 8 shows Java pseudo-code that defines a caching property in line 810. The "caching" property is a boolean flag that determines whether or not retrieving data from a cache is allowed when processing a query. The value of the caching property is given by the boolean value that follows the caching property, and when the boolean value is zero, caching is disabled, while a boolean value of one enables caching. Line 820 shows the class for which the properties in line 810 are defined. Line 830 defines which database the application will use. Line 840 simply specifies an exception that is processed if an error is encountered when attempting to establish a connection to the database. The code in FIG. 8 is shown as a way to specify a property for a connection that can determine whether or not the use of cached data is allowed. If the caching property is set to a value of zero, caching of query results is disabled. If the caching property is set to a value of one, caching of query results is enabled.

Figure 9:
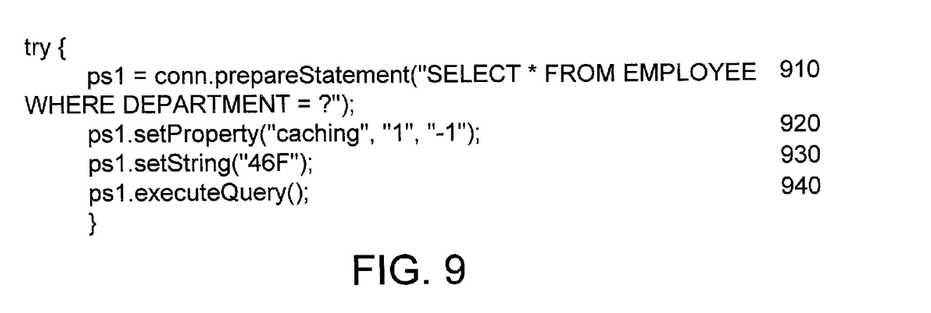
FIG. 9 is a sample query in Java pseudo-code.

FIG. 9 is Java pseudo-code for a sample database query that includes a prepared statement in line 910. Note that this prepared statement is the same as the prepared statement in FIG. 3, with a variable "?" that allows specifying which department to search for in the employee table. Line 920 sets the caching property to a value of one, which enables caching, and sets the second parameter to "−1", which means that all result sets for the given SQL statement will be cached. Line 930 sets the variable ? in the prepared statement to a string value of 46F. Line 940 executes the query. The result of executing the query of FIG. 9 on the employee table of FIG. 4 is shown as the result set of FIG. 10. Note that the three records for employees with a department code of 46 in the employee table of FIG. 4 are included in the result set in FIG. 10.

One problem that results from caching results of a database query is the issue of data staleness. In other words, how do we know the data in the cache is the same as the data in the database? A first query could be executed, with the results being stored in the cache. However, the corresponding data in the database could then be updated, rendering the data in the cache stale (or not up to date). To handle this problem, the preferred embodiments include a data staleness handler (e.g., 129 in FIG. 1) that either disables the use of cached data in certain circumstances, or maintains the information in the cache so it does not become excessively stale. Examples follow.

Figure 11:
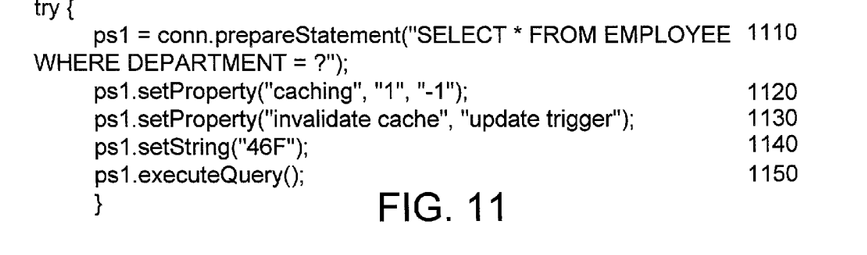
FIG. 11 is a sample query in Java pseudo-code that sets an update trigger for retrieved data.

FIG. 11 shows a sample query that includes the same prepared statement in line 1110 that is present in line 910 of FIG. 9. Line 1120 sets caching on, with all returned result sets being cached. Line 1130 sets two other properties, namely "invalidate cache" and "update trigger". An update trigger monitors data in the database that corresponds to cached data, and when any of the corresponding data in the database is updated, the specified action (namely, invalidate cache) will be performed. In other words, whenever an update trigger fires to indicate that the data in the database corresponding to cached data has changed, the cache will be invalidated. Line 1140 sets the value of the ? parameter in the prepared statement to the string 46F, and line 1150 executes the query. The code in FIG. 11 illustrates that the data staleness handler 129 may set update triggers to assure that cached data is not used if the underlying data in the database has changed. Note that the action of "invalidate cache" in line 1130 may include a simple invalidation of the cache that will force the next prepared statement to go to the database. In the alternative, the action of "invalidate cache" could include two steps: 1) the cache is invalidated so it cannot be used; and 2) the database is queried to reload the cache with the newly-changed data. Both of these options are within the scope of the preferred embodiments.

Figure 10:
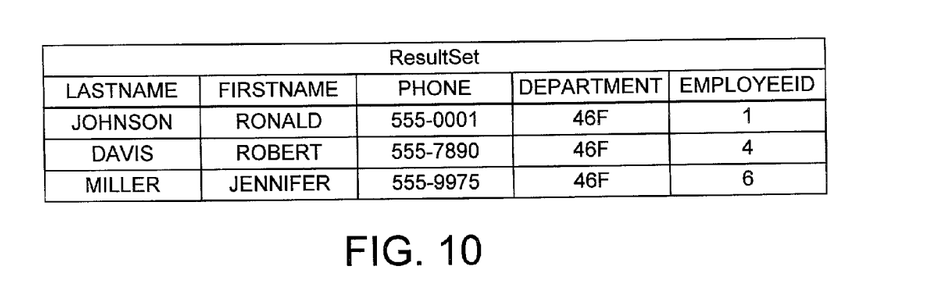
FIG. 10 is a table showing data that results from executing the query of FIG. 9 on the employee table in FIG. 4.
Figure 12:
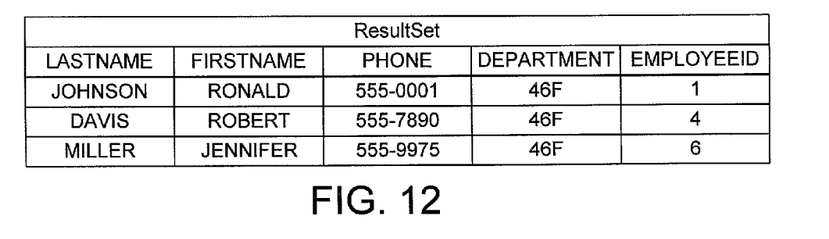
FIG. 12 is a table showing data that results from executing the query of FIG. 9 on the employee table in FIG. 4.
Figure 13:
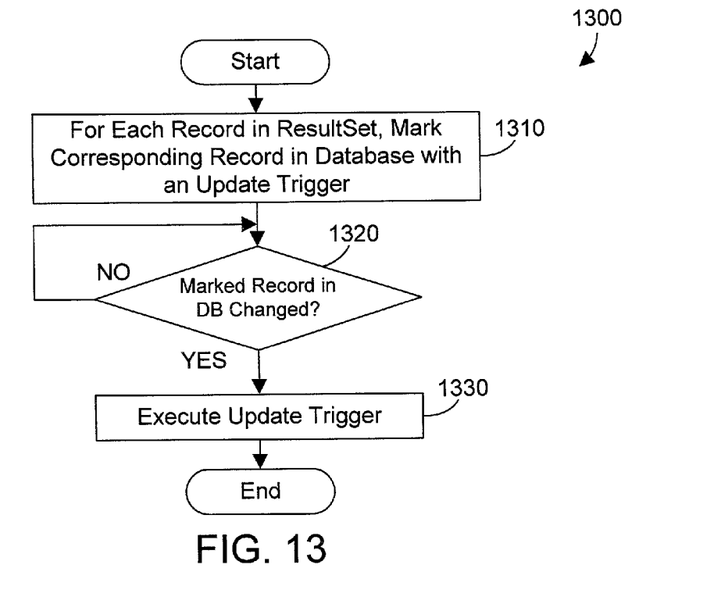
FIG. 13 is a flow diagram of a method for executing an update trigger when marked records in a database change.

Executing the query in FIG. 11 results in the result set of FIG. 12, which is identical to the result set in FIG. 10. The difference is that the update trigger has been enabled, which monitors the database records corresponding to the records in the result set. If any column in any monitored record changes, the result set is invalidated in the cache. This is shown in method 1300 of FIG. 13. Method 1300 starts by locating the database records that correspond to records in the result set, and marking those records with an update trigger (step 1310). The update trigger monitors for changes to the marked database records. When a change occurs to a marked database record (step 1320=YES), the update trigger is executed (step 1330). As explained above, the execution of the update trigger may simply invalidate the result set in the cache, and may additionally reload the cache from the database. Note that in the preferred embodiments, the update trigger may also be set to trigger only on the updating of particular columns in the monitored record, rather than triggering on the updating of any column in the monitored record.

Figure 14:
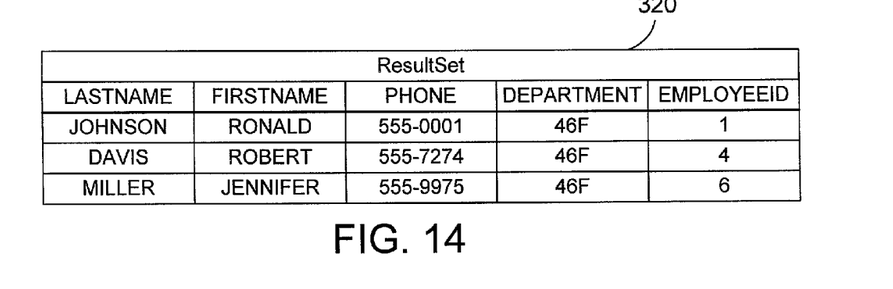
FIG. 14 is a table showing the updating of the cached data in FIG. 12 by the update trigger when the phone number for employee Robert Davis changes in the database.

We assume that method 1300 is performed for the result set in FIG. 12, and that the phone number of Robert Davis is updated in the database. This causes the update trigger to fire, which invalidates the cache, and may also reload the cache from the database. FIG. 14 shows the result set of FIG. 12 after an update trigger has detected the change to Robert Davis' phone number, after the cached result set is invalidated, and after the cached result set is reloaded from the database to reflect the changed data. We thus see in FIG. 14 that the new result set has identical data to the result set of FIG. 12 with the exception of Robert Davis' phone number, which has changed. The update trigger capability illustrated in FIGS. 11–14 is one possible feature of the data staleness handler 129 in FIG. 1.

Figure 15:
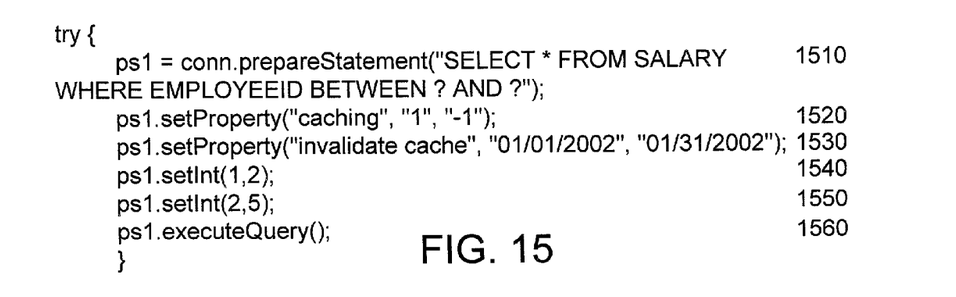
FIG. 15 is a sample query in Java pseudo-code that invalidates a cache for a specified date range.

FIG. 15 shows Java pseudo-code for a query to the Salary table of FIG. 5. Note that the prepared statement in line 1510 includes two separate parameters that specify a range of employee IDs. Line 1520 enables caching, and specifies by the "−1" value that all returned result sets should be cached. Line 1530 specifies new conditions for invalidating a cache, namely, during a date span. The dates Jan. 1, 2002 and Jan. 31, 2002 are entered as properties, and whenever a query is performed in this date range, the use of cached data is not allowed. Specifying a date range for disabling data caching allows for significant customization of the caching operation depending on the type of the database data being accessed. We assume for this example that raises are awarded in January of each calendar year, and employee's salaries do not change during all other times of the year. Line 1530 specifies that during the month of January, caching is disabled, but enabled for all other dates during the year. Line 1540 sets the first variable in the select statement to the value of 2, and line 1550 sets the second variable in the select statement to the value of 5. Line 1560 executes the query. The result of executing the query of FIG. 15 is the result set shown in FIG. 16.

Figure 16:
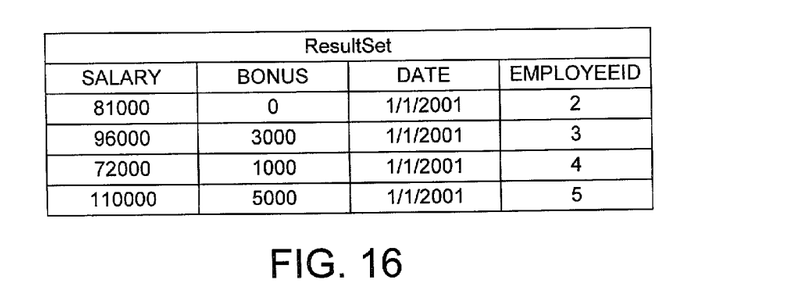
FIG. 16 is a table showing data that results from executing the query of FIG. 15 on the Salary table of FIG. 5.

All records that have an employee ID from 2 to 5 are contained in the result set of FIG. 16. The data in the result set is stored in the cache, and can be potentially used to satisfy future queries that are not during the month of January 2002. Note that a time range could be alternatively specified instead of a date range. For example, let's assume that all changes to the database are made between 2:00 AM and 4:00 AM by a batch processing job. In this situation, a time range limitation could disable the use of cached data from 2:00 AM to 4:00 AM each day. Of course, specifying dates or times that caching is allowed is equivalent to specifying dates or times that caching is not allowed. FIGS. 15 and 16 illustrate how the data staleness handler 129 of FIG. 1 can reduce the likelihood of accessing stale data in a cache by disabling caching for a specified date or time range.

Figure 17:
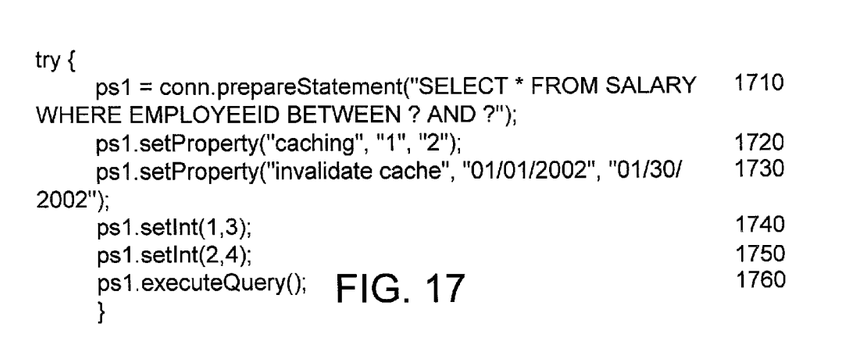
FIG. 17 is a sample query in Java pseudo-code that retrieves a subset of data retrieved by the query in FIG. 15.

Another query to the Salary table is shown in FIG. 17. Line 1710 includes the same prepared statement as line 1510 in FIG. 15. In line 1720, caching is turned on, and the number of results are limited to two. Line 1730 has the same date range limitation as line 1530 of FIG. 15. The first parameter in the prepared statement is set to a value of 3 in line 1740, while the second parameter is set to a value of 4 in line 1750. Finally, the query is executed in step 1760. Note that the range of employee ID values specified in the query of FIG. 17 is 3–4, which is a subset of the range 2–5 in the query of FIG. 15. As a result, cached values for the result set of FIG. 16 may be used to return the subset of values shown in FIG. 18. The preferred embodiments thus expressly extend to returning all or part of cached data in processing a later query.

Figures 18, 19:
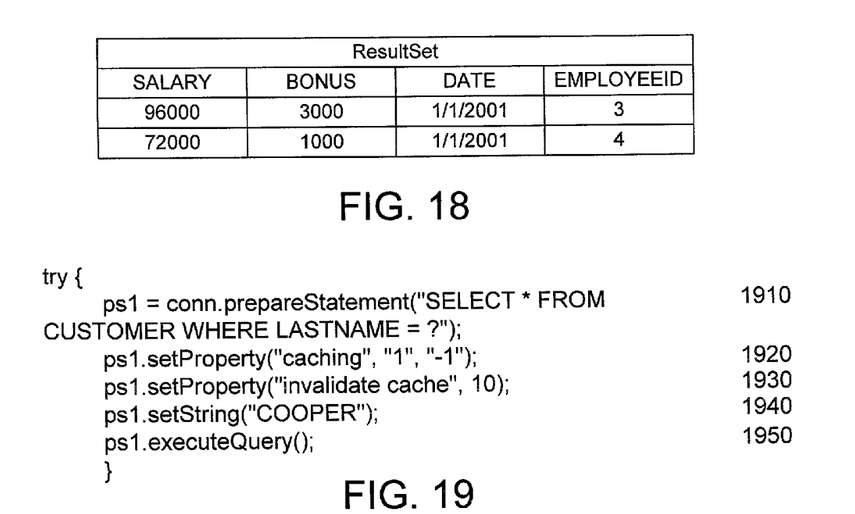
FIG. 18 is a table showing how a result set that is a subset of cached data can be generated from the cached data in FIG. 16.
FIG. 19 is a sample query in Java pseudo-code that sets a timer for updating data stored in a cache.
Figure 20:
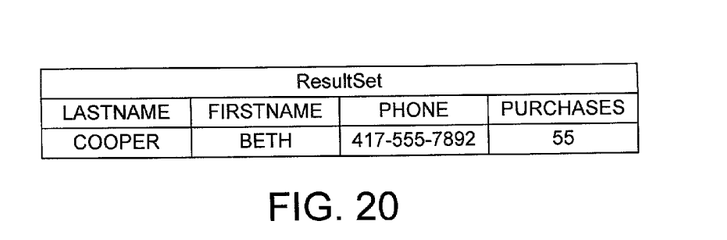
FIG. 20 is a table showing the result of processing the query in FIG. 19 on the Customer table of FIG. 6.

Yet another way for the data staleness handler 129 to address the issue of data staleness is to use a timer to periodically invalidate the cache. The query of FIG. 19 illustrates this approach. Line 1910 is a prepared statement that retrieves data from the Customer table in FIG. 6 by specifying the last name of the customer. We assume for this example that all applications that access the customer information do not require real-time data, and could have the information be up to ten minutes out of date. As a result, a ten minute timer is setup, and when the timer times out, the cache is invalidated. Line 1920 enables caching, and specifies that all returned result sets should be cached. Line 1930 specifies that the cache will be invalidated every 10 minutes. Line 1940 specifies the string "COOPER" as the value of the ? variable in the prepared statement in line 1910. Finally, line 1950 executes the query. The result of executing the query of FIG. 19 is the result set of FIG. 20. Note that setting up the timer in line 1930 results in the result set being invalidated every ten minutes. Invalidating the cache forces the next query that includes the prepared statement in line 1910 to go to the database for its data, which can then be loaded into the cache for another ten minutes. In the alternative, invalidating the cache may include the step of reloading the cache with the corresponding data from the database.

Figure 21:
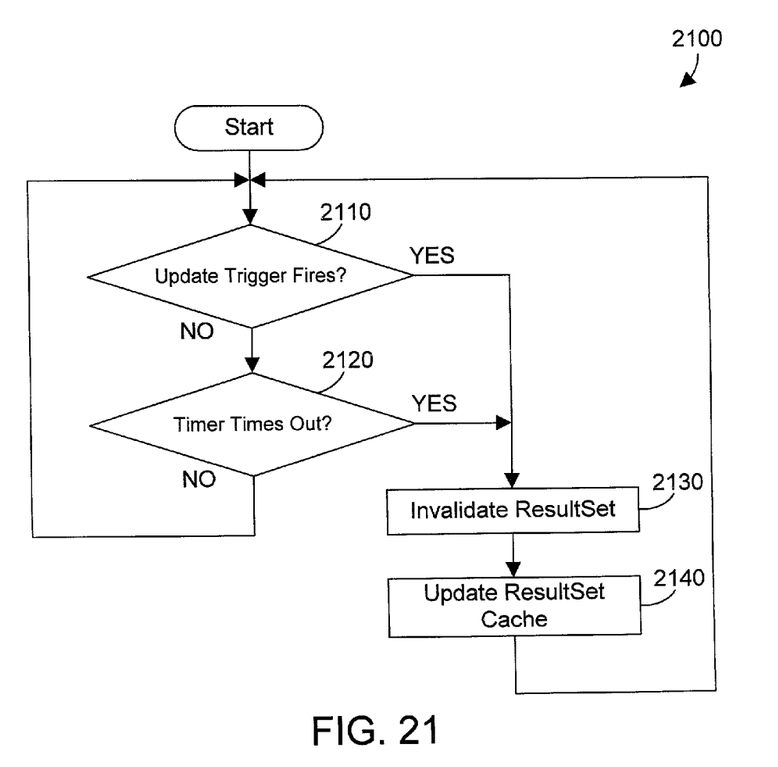
FIG. 21 is a flow diagram of a method for invalidating cache entries in the event of an update trigger firing or a timer timing out.

Referring now to FIG. 21, a method 2100 is preferably performed by the data staleness handler 129 of FIG. 1. This is a method that is performed if an update trigger has been setup (as in line 1130 of FIG. 11) or if a timer has been setup (as in line 1930 of FIG. 19). If an update trigger fires (step 2110=YES), the result set in the cache is invalidated (step 2130). In similar fashion, if a timer times out (step 2120=YES), the result set in the cache is also invalidated (step 2130). Note that method 2100 may optionally include the step of updating the result set in the cache (step 2140) by reloading the result set from the corresponding data in the database. Method 2100 is performed after an update trigger or timer has been setup in a query.

Figure 22:
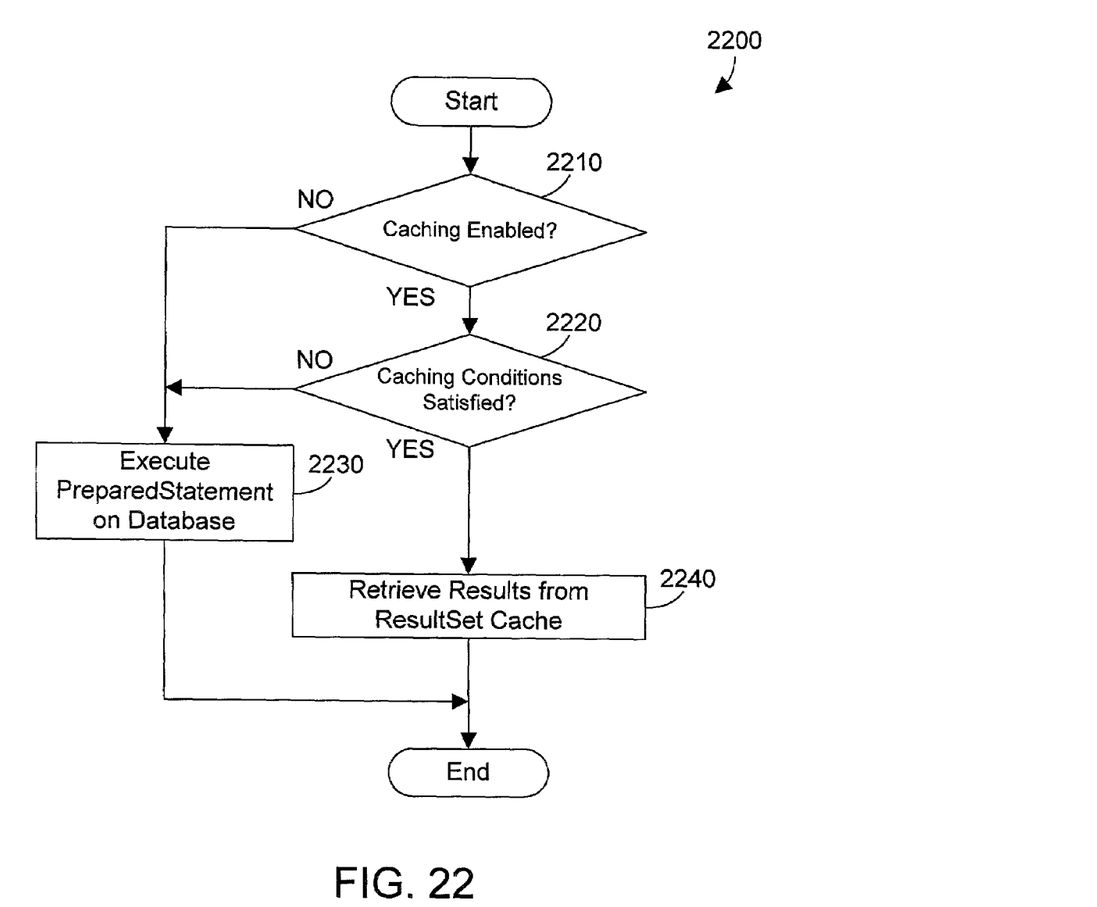
FIG. 22 is a flow diagram of a method for forcing the query processor to retrieve data from the database when caching is disabled or when conditions for caching are not met.

The data staleness handler 129 may also function to determine whether use of cached data is allowed while processing a query, as shown by method 2200 in FIG. 22. If caching is disabled in the query (step 2210=NO), the prepared statement is executed by retrieving data from the database (step 2230). Similarly, if any caching conditions (such as date or time ranges) are not satisfied (step 2220=NO), the prepared statement is executed by retrieving data from the database (step 2230). However, if caching is enabled (step 2210=YES) and all caching conditions are satisfied (step 2220=YES), the results of the query may be retrieved from the cache (step 2240). In this way the query processor may benefit from cached data in some circumstances, yet may still go directly to the database (bypassing the cache) if needed.

Note that step 2130 in FIG. 21 is the step if invalidating a cached result set. This invalidation can be done at the level of each individual result set within a cache, or the entire cache could be invalidated if any value within any result set is invalidated.

The preferred embodiments provide significant power and flexibility in processing database queries. Caching properties may be defined according to the type of data being accessed, and frequency with which it changes, time or date ranges that it changes, etc. By allowing the specification of custom properties that define whether or not the use of cached data is allowed, the preferred embodiments provide a balanced approach between the benefits of caching with flexibility to disable caching or limit caching in particular circumstances.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
at least one processor;
a memory coupled to the at least one processor;
a database residing in the memory;
a query processor residing in the memory and executed by the at least one processor, the query processor caching data retrieved from the database as a result of a first query, and returning cached data when processing a second query to the database instead of accessing data in the database; and a data staleness handler that determines from a specified parameter in the second query whether use of cached data is enabled when processing the second query and does not return the cached data when processing the second query if a specified range of values for using the cached data is not satisfied or if the specified parameter specifies that use of cached data is disabled when processing the second query.

2. The apparatus of claim 1 wherein the first query comprises a prepared statement having a first specified value, and wherein the second query comprises the prepared statement having a second specified value, wherein the second query is capable of being satisfied by data retrieved from the database during the processing of the first query.

3. The apparatus of claim 1 wherein the specified range of values comprises a range of times during which use of the cached data is not allowed.

4. The apparatus of claim 1 wherein the specified range of values comprises a range of dates during which use of the cached data is not allowed.

5. The apparatus of claim 1 wherein the data staleness handler monitors selected data in the database that corresponds to at least a portion of the cached data, and that invalidates the cached data when the selected data in the database changes.

6. The apparatus of claim 5 wherein the data staleness handler updates the cached data by retrieving the changed data from the database when the cached data is invalidated.

7. The apparatus of claim 1 wherein the data staleness handler uses a timer to invalidate the cached data when the timer times out.

8. The apparatus of claim 7 wherein the data staleness handler updates the cached data by retrieving the changed data from the database when the cached data is invalidated.

9. The apparatus of claim 7 wherein the query processor may bypass the cached data and return data from the database under specified conditions.

10. An apparatus comprising:
at least one processor;
a memory coupled to the at least one processor;
a database residing in the memory;
a cache residing in the memory;
a query processor residing in the memory and executed by the at least one processor, the query processor storing data retrieved from the database into the cache as a result of a first query, and returning data from the cache when processing a second query to the database instead of accessing the data in the database if specified conditions for returning the cached data are satisfied;
a data staleness handler residing in the memory and executed by the at least one processor, wherein the data staleness handler indicates to the query processor when the cached data cannot be returned, wherein the data staleness handler indicates to the query processor that the cached data cannot be returned when processing the second query if use of cached data is disabled in the second query, wherein the data staleness handler indicates to the query processor that the cached data cannot be returned during a specified range of times, wherein the data staleness handler indicates to the query processor that the cached data cannot be returned during a specified range of dates, wherein the data staleness handler monitors selected data in the database that corresponds to at least a portion of the cached data and invalidates the cached data when the selected data in the database changes, wherein the data staleness handler uses a timer to invalidate the cached data when the timer times out, wherein the data staleness handler updates the cached data by retrieving the changed data from the database into the cache when the cached data is invalidated.

11. A computer-implemented method for processing a second query to a database, the method comprising the steps of
(A) processing a first query to the database by performing the steps of
(A1) retrieving data from the database that satisfies the first query;
(A2) storing the retrieved data in a cache; and
(A3) returning the retrieved data;
(B) processing the second query by performing the steps of
(B1) determining from a specified parameter in the second query whether use of cached data is allowed in processing the second query:
(B2) determining whether the second query is capable of being satisfied by data stored in the cache;
(B3) determining whether use of cached data is allowed depending on whether a specified range of values for using the cache is satisfied;
(B4) if the query is capable of being satisfied by data stored in the cache and the use of cached data is allowed, retrieving data from the cache that satisfies the second query, and returning the data retrieved from the cache;
(B5) if the query is not capable of being satisfied by data stored in the cache, retrieving data from the database that satisfies the second query, and returning the data that satisfies the second query;
(B6) if the use of cached data is not allowed as determined instep (B1), retrieving data from the database that satisfies the second query, and returning the retrieved data that satisfies the second query.

12. The method of claim 11 wherein the specified range of values comprises a range of times during which use of the cached data is not allowed.

13. The method of claim 11 wherein the specified range of values comprises a range of dates during which use of the cached data is not allowed.

14. The method of claim 11 further comprising the steps of:
monitoring data in the database that corresponds to cached data; and
invalidating the cached data when the corresponding data in the database changes.

15. The method of claim 14 further comprising the step of updating the cached data by retrieving the changed data from the database into the cache when the cached data is invalidated.

16. The method of claim 11 further comprising the step of invalidating the cached data when a timer times out.

17. The method of claim 16 further comprising the step of updating the cached data by retrieving the changed data from the database into the cache when the cached data is invalidated.

18. The method of claim 16 further comprising the step of bypassing the cached data and retrieving the data from the database under specified conditions.

19. A computer-implemented method for processing a second query to a database, the method comprising the steps of:

(A) processing a first query to the database by performing the steps of:
  (A1) retrieving data from the database that satisfies the first query;
  (A2) storing the retrieved data in a cache; and
  (A3) returning the retrieved data;
(B) processing the second query by performing the steps of:
  (B1) determining whether the second query is capable of being satisfied by data stored in the cache;
  (B2) determining whether caching is disabled in the second query;
  (B3) determining whether the second query specifies a range of times during which use of the cached data is not allowed;
  (B4) determining whether the second query specifies a range of dates during which use of the cached data is not allowed;
  (B5) if the query is capable of being satisfied by data stored in the cache, if step (B2) indicates that caching is not disabled, and if steps (B3) and (B4) indicate that use of the cached data is allowed, retrieving the data from the cache that satisfies the second query and returning the data that satisfies the second query;
  (B6) if the query is not capable of being satisfied by data stored in the cache, retrieving data from the database that satisfies the second query, and returning the data that satisfies the second query;
  (B7) if step (B2) indicates that caching is disabled in the second query, retrieving data from the database that satisfies the second query, and returning the retrieved data that satisfies the second query; and
  (B8) if either of steps (B3) and (B4) indicate that use of the cached data is not allowed, retrieving data from the database and returning the data retrieved from the database.

20. The method of claim 19 further comprising the steps of:
  monitoring data in the database that corresponds to cached data; and
  invalidating the cached data when the corresponding data in the database changes.

21. The method of claim 20 further comprising the step of updating the cached data by retrieving the changed data from the database into the cache when the cached data is invalidated.

22. The method of claim 19 further comprising the step of invalidating the cached data when a timer times out.

23. The method of claim 22 further comprising the step of updating the cached data by retrieving the changed data from the database into the cache when the cached data is invalidated.

24. A program product comprising:
  (A) a query processor that caches data retrieved from a database as a result of a first query, and returns cached data when processing a second query to the database instead of accessing data in the database wherein the query processor includes a data staleness handler that determines from a specified parameter in the second query whether use of cached data is enabled when processing the second query and does not return the cached data when processing the second query if a specified range of values for using the cached data is not satisfied or if the specified parameter specifies that use of cached data is disabled when processing the second query; and
  (B) recordable computer-readable signal bearing media bearing the query processor.

25. The program product of claim 24 wherein the first query comprises a prepared statement having a first specified value, and wherein the second query comprises the prepared statement having a second specified value, wherein the second query may be satisfied by data retrieved from the database during the processing of the first query.

26. The program product of claim 24 wherein the specified range of values comprises a range of times during which use of the cached data is not allowed.

27. The program product of claim 24 wherein the specified range of values comprises a range of dates during which use of the cached data is not allowed.

28. The program product of claim 24 wherein the data staleness handler monitors selected data in the database that corresponds to at least a portion of the cached data, and that invalidates the cached data when the selected data in the database changes.

29. The program product of claim 28 wherein the data staleness handler updates the cached data by retrieving the changed data from the database when the cached data is invalidated.

30. The program product of claim 24 wherein the data staleness handler uses a timer to invalidate the cached data when the timer times out.

31. The program product of claim 30 wherein the data staleness handler updates the cached data by retrieving the changed data from the database when the cached data is invalidated.

32. The program product of claim 24 wherein the query processor may bypass the cached data and return data from the database under specified conditions.

33. A program product comprising:
  (A) a query that stores data retrieved from a database into a cache as a result of a first query, and returns data from the cache when processing a second query to the database instead of accessing the data in the database if specified conditions for returning the cached data are satisfied;
  (B) a data staleness handler that indicates to the query processor when the cached data cannot be returned, wherein the data staleness handler indicates to the query processor that the cached data cannot be returned when processing the second query if use of cached data is disabled in the second query, wherein the data staleness handler indicates to the query processor that the cached data cannot be returned during a specified range of times, wherein the data staleness handler indicates to the query processor that the cached data cannot be returned during a specified range of dates, wherein the data staleness handler monitors selected data in the database that corresponds to at least a portion of the cached data and invalidates the cached data when the selected data in the database changes, wherein the data staleness handler uses a timer to invalidate the cached data when the timer times out, wherein the data staleness handler updates the cached data by retrieving the changed data from the database into the cache when the cached data is invalidated; and
  (C) recordable computer-readable signal bearing media bearing the query processor and the data staleness handler.

* * * * *